US011006177B2

(12) United States Patent
Smoyer et al.

(10) Patent No.: US 11,006,177 B2
(45) Date of Patent: *May 11, 2021

(54) SYSTEM AND METHOD FOR UTILIZING A SECURED SERVICE PROVIDER MEMORY (71) Applicant: CenturyLink Intellectual Property LLC, Broomfield, CO (US)

(72) Inventors: Clinton J. Smoyer, Raymore, MO (US); Andrew V. Cook, Sheldon, IA (US); Jade D. Kerr, Kansas City, MO (US); Michael P. Morrissey, Overland Park, KS (US); Kevin M. McBride, Lone Tree, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,874

(22) Filed: Apr. 29, 2019

(65) Prior Publication Data
US 2019/0253759 A1   Aug. 15, 2019

Related U.S. Application Data (62) Division of application No. 15/056,413, filed on Feb. 29, 2016, now Pat. No. 10,277,947, which is a
(Continued)

(51) Int. Cl.
*H04N 21/466* (2011.01)
*H04N 21/6543* (2011.01)
(Continued)

(52) U.S. Cl.
CPC ..... *H04N 21/4667* (2013.01); *H04N 7/17318* (2013.01); *H04N 21/2402* (2013.01);
(Continued)

(58) Field of Classification Search
CPC .......... H04N 21/4667; H04N 21/2402; H04N 21/25891; H04N 21/26275;
(Continued)

(56) References Cited

U.S. PATENT DOCUMENTS 5,357,276 A  10/1994 Banker et al.
5,453,779 A   9/1995 Dan et al.
(Continued)

OTHER PUBLICATIONS

Oz, Ran, "Switched Unicast: It's Not Just About Capacity", BigBand Networks, pp. 1-11.
(Continued)

*Primary Examiner* — Pinkal R Chokshi
(74) *Attorney, Agent, or Firm* — Lumen Patent Firm (57) ABSTRACT A system and method for utilizing a secured service provider memory are disclosed. An electronic device is associated with a subscriber and is in communication with a data distribution network configured to deliver data by a service provider to the subscriber. The data distribution network comprises a server in communication with the data distribution network and the server configured to deliver a stream of data over the data distribution network. The electronic device comprises a first memory communicatively connected to the server. The first memory is configured to receive and store data from the server and it is accessible by the subscriber. A second memory is also communicatively connected to the server. The second memory is configured to receive and store data from the server, though the second memory is accessible only by the service provider.

5 Claims, 9 Drawing Sheets

Related U.S. Application Data division of application No. 12/487,163, filed on Jun. 18, 2009, now Pat. No. 9,307,205.

(51) Int. Cl.

| | |
|---|---|
| *H04N 21/258* | (2011.01) |
| *H04N 21/262* | (2011.01) |
| *H04N 21/433* | (2011.01) |
| *H04N 21/4335* | (2011.01) |
| *H04N 21/472* | (2011.01) |
| *H04N 21/6405* | (2011.01) |
| *H04N 7/173* | (2011.01) |
| *H04N 21/24* | (2011.01) |
| *H04N 21/2668* | (2011.01) |
| *H04N 21/4147* | (2011.01) |
| *H04N 21/437* | (2011.01) |
| *H04N 21/442* | (2011.01) |
| *H04N 21/45* | (2011.01) |
| *H04N 21/61* | (2011.01) |
| *H04N 21/643* | (2011.01) |

(52) U.S. Cl.
CPC ... *H04N 21/25891* (2013.01); *H04N 21/2668* (2013.01); *H04N 21/26275* (2013.01); *H04N 21/4147* (2013.01); *H04N 21/437* (2013.01); *H04N 21/4331* (2013.01); *H04N 21/4334* (2013.01); *H04N 21/4335* (2013.01); *H04N 21/44222* (2013.01); *H04N 21/4532* (2013.01); *H04N 21/47202* (2013.01); *H04N 21/6125* (2013.01); *H04N 21/6405* (2013.01); *H04N 21/64322* (2013.01); *H04N 21/6543* (2013.01)

(58) Field of Classification Search
CPC ........... H04N 21/2668; H04N 21/4147; H04N 21/4331; H04N 21/4334; H04N 21/4335; H04N 21/437; H04N 21/44222; H04N 21/4532; H04N 21/47202; H04N 21/6125; H04N 21/6405; H04N 21/64322; H04N 21/6543

See application file for complete search history.

(56) References Cited

U.S. PATENT DOCUMENTS

| | | | |
|---|---|---|---|
| 5,461,415 A | 10/1995 | Wolf et al. | |
| 5,477,263 A | 12/1995 | O'Callaghan et al. | |
| 5,629,732 A | 5/1997 | Moskowitz et al. | |
| 5,812,934 A | 9/1998 | Hard et al. | |
| 5,959,968 A | 9/1999 | Chin et al. | |
| 5,995,518 A | 11/1999 | Burns et al. | |
| 6,018,359 A | 1/2000 | Kermode et al. | |
| 6,208,799 B1 | 3/2001 | Marsh | |
| 6,473,424 B1 | 10/2002 | DeJager et al. | |
| 6,543,053 B1 | 4/2003 | Li et al. | |
| 6,658,663 B1 | 12/2003 | Bruynsteen | |
| 6,667,975 B1 | 12/2003 | DeJager et al. | |
| 6,788,765 B1 | 9/2004 | Beamon | |
| 6,832,242 B2 * | 12/2004 | Keskar | H04L 67/306 |
| | | | 707/999.201 |
| 7,080,400 B1 * | 7/2006 | Navar | H04N 7/17336 |
| | | | 348/E7.073 |
| 7,107,606 B2 | 9/2006 | Lee | |
| 7,130,399 B1 | 10/2006 | Jean et al. | |
| 7,463,730 B2 | 12/2008 | Katkam et al. | |
| 7,647,618 B1 | 1/2010 | Hunter et al. | |
| 7,680,993 B2 | 3/2010 | Dougall | |
| 7,734,771 B2 | 6/2010 | Watson et al. | |
| 7,809,849 B2 * | 10/2010 | Sie | H04N 7/17336 |
| | | | 709/231 |
| 7,895,625 B1 | 2/2011 | Bryan et al. | |
| 7,919,979 B1 | 4/2011 | Mason et al. | |
| 8,074,041 B2 | 12/2011 | Clark | |
| 8,275,095 B2 | 9/2012 | Smith | |
| 8,495,689 B2 | 7/2013 | Cook et al. | |
| 8,635,355 B2 | 1/2014 | Harris | |
| 9,307,205 B2 | 4/2016 | Smoyer et al. | |
| 9,396,195 B1 | 7/2016 | Beguelin | |
| 9,710,225 B2 | 7/2017 | Gazdzinski | |
| 2002/0053090 A1 * | 5/2002 | Okayama | H04N 7/163 |
| | | | 725/152 |
| 2002/0095510 A1 | 7/2002 | Sie et al. | |
| 2003/0191908 A1 | 10/2003 | Cohn | |
| 2003/0229681 A1 | 12/2003 | Levitan | |
| 2004/0001512 A1 | 1/2004 | Challener et al. | |
| 2004/0162876 A1 | 8/2004 | Kohavi | |
| 2004/0267971 A1 | 12/2004 | Seshadri | |
| 2005/0010964 A1 | 1/2005 | Sano | |
| 2005/0022242 A1 | 1/2005 | Rosetti et al. | |
| 2005/0050577 A1 | 3/2005 | Westbrook | |
| 2005/0055718 A1 | 3/2005 | Stone | |
| 2005/0210527 A1 | 9/2005 | Hisamatsu et al. | |
| 2006/0072543 A1 | 4/2006 | Lloyd et al. | |
| 2007/0032975 A1 | 2/2007 | Mori et al. | |
| 2007/0067484 A1 | 3/2007 | Cheung et al. | |
| 2007/0074258 A1 | 3/2007 | Wood et al. | |
| 2007/0107026 A1 | 5/2007 | Sherer et al. | |
| 2007/0162502 A1 | 7/2007 | Thomas et al. | |
| 2007/0277205 A1 | 11/2007 | Grannan | |
| 2008/0046584 A1 | 2/2008 | Tucker | |
| 2008/0059884 A1 | 3/2008 | Ellis | |
| 2008/0114862 A1 | 5/2008 | Moghaddam et al. | |
| 2008/0209062 A1 | 8/2008 | Barrett | |
| 2008/0250478 A1 | 10/2008 | Miller et al. | |
| 2008/0259841 A1 | 10/2008 | Deshpande | |
| 2008/0028891 A1 | 11/2008 | Smoyer et al. | |
| 2008/0307453 A1 | 12/2008 | Haberman | |
| 2009/0099919 A1 | 4/2009 | Schultheiss et al. | |
| 2009/0150926 A1 * | 6/2009 | Schlack | H04L 12/1859 |
| | | | 725/34 |
| 2009/0193486 A1 | 7/2009 | Patel et al. | |
| 2009/0199283 A1 | 8/2009 | Jain | |
| 2011/0085551 A1 | 4/2011 | Sridhar et al. | |
| 2012/0210341 A1 | 8/2012 | Burke et al. | |
| 2014/0323092 A1 * | 10/2014 | Jain | G06K 19/07739 |
| | | | 455/411 |
| 2016/0182953 A1 | 6/2016 | Smoyer et al. | |

OTHER PUBLICATIONS

"Video on Demand," http://enwikipedia.org/wiki/Video_on_demand; Jan. 8, 2009; 5 pages.

* cited by examiner

SYSTEM AND METHOD FOR UTILIZING A SECURED SERVICE PROVIDER MEMORY

CROSS REFERENCE TO RELATED APPLICATIONS

This application is a divisional of U.S. patent application Ser. No. 15/056,413, filed Feb. 29, 2016 by Clinton J. Smoyer et al. and titled, "System and Method for Utilizing a Secured Service Provider Memory", which is a divisional of U.S. patent application Ser. No. 12/487,163, (now U.S. Pat. No. 9,307,205) filed Jun. 18, 2009 by Clinton J. Smoyer et al. and titled, "System and Method for Utilizing a Secured Service Provider Memory", both of which are herein incorporated by reference in their entirety.

BACKGROUND

As technology has developed, so have the ways in which viewers obtain video content. Not long ago, viewers could either watch video broadcast to their television sets or by traveling to the local cinema to watch a motion picture. VHS tapes and DVDs eventually emerged, both of which allowed viewers to watch the video content whenever they chose.

With the development of Internet protocol television (IPTV), communication companies are establishing networks for subscribers to watch video content. Generally, IPTV describes a system where a digital television service is delivered using Internet protocol (IP) over a network. The network used for IPTV may include the public Internet or a private IP network controlled by an IPTV service provider via a broadband connection known as digital subscriber lines (DSL), where the digital subscriber lines typically include conventional telephone lines with copper wire into households. Alternatively, the digital subscriber line may be fiber to the premises (FTTP). Telecommunication service provider companies that have begun offering DSL have limited bandwidth resources, particularly when delivering video over existing copper wire infrastructures.

Figure 1:
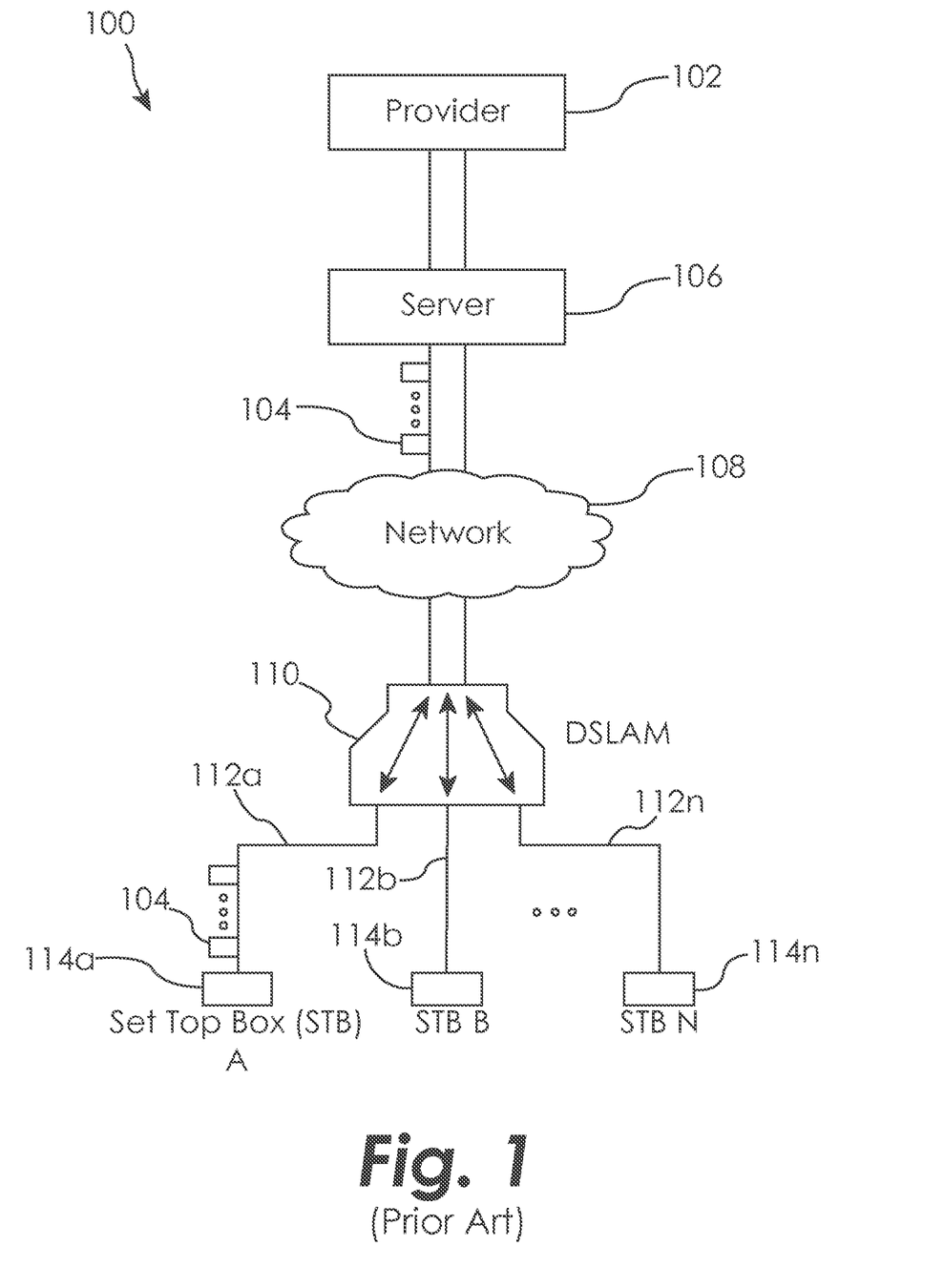
FIG. 1 is an illustration of a conventional system configured to deliver VOD via a unicast stream.

In additional to television programming, many communications companies offer their subscribers video on demand (VOD) services. FIG. 1 is an illustration of a conventional system 100 that is configured to deliver VOD. As shown, a provider 102 is communicatively connected to a head-end server 106. Server 106 is used to store video content delivered to it from service provider 102. The server 106 is also capable of delivering video content 104 over a network 108, such as the internet or public/private packet switched network (PSN), for example. As shown, server 106 is configured to transmit video content in the form of data packets 104. The server 106 delivers the video content 104 via the network 108 to a DSL access multiplexer (DSLAM) 110. The DSLAM 110 operates to connect subscribers to the network 108, host video streams/Internet group management protocol (IGMP), and provide Ethernet transport of the video content. The DSLAM 110 further operates as a multiplexer to distribute the video content 104 through communication lines 112a-112n to set top boxes (STB) 114a-114n (collectively 114). Additionally, the DSLAM 110 may also communicate VOD requests from a particular STB 114 to the server 106 via network 108.

Today, VOD typically exists as a unicast video stream, as illustrated in FIG. 1. In a unicast stream set-up, there is one video stream for each subscriber requesting the video content. Therefore, if 100 subscribers request to receive a particular video file, 100 distinct copies of the video are delivered through the system. As shown in FIG. 1, STB A 114a initiated the request for video 104. After STB A 114a requested the video, server 106 initiated the delivery through network 108 and to STB A 114a. As shown, STBs B-N 114b-n did not receive the video. However, if STB B 114b requested the same video only moments after STB A 114a, duplicate copies of the video content 104 would simultaneously be streamed through the network 108. As can be appreciated, delivering video through a unicast video stream can bombard systems and dramatically reduce available system bandwidth when multiple subscribers request video content.

Figure 2:
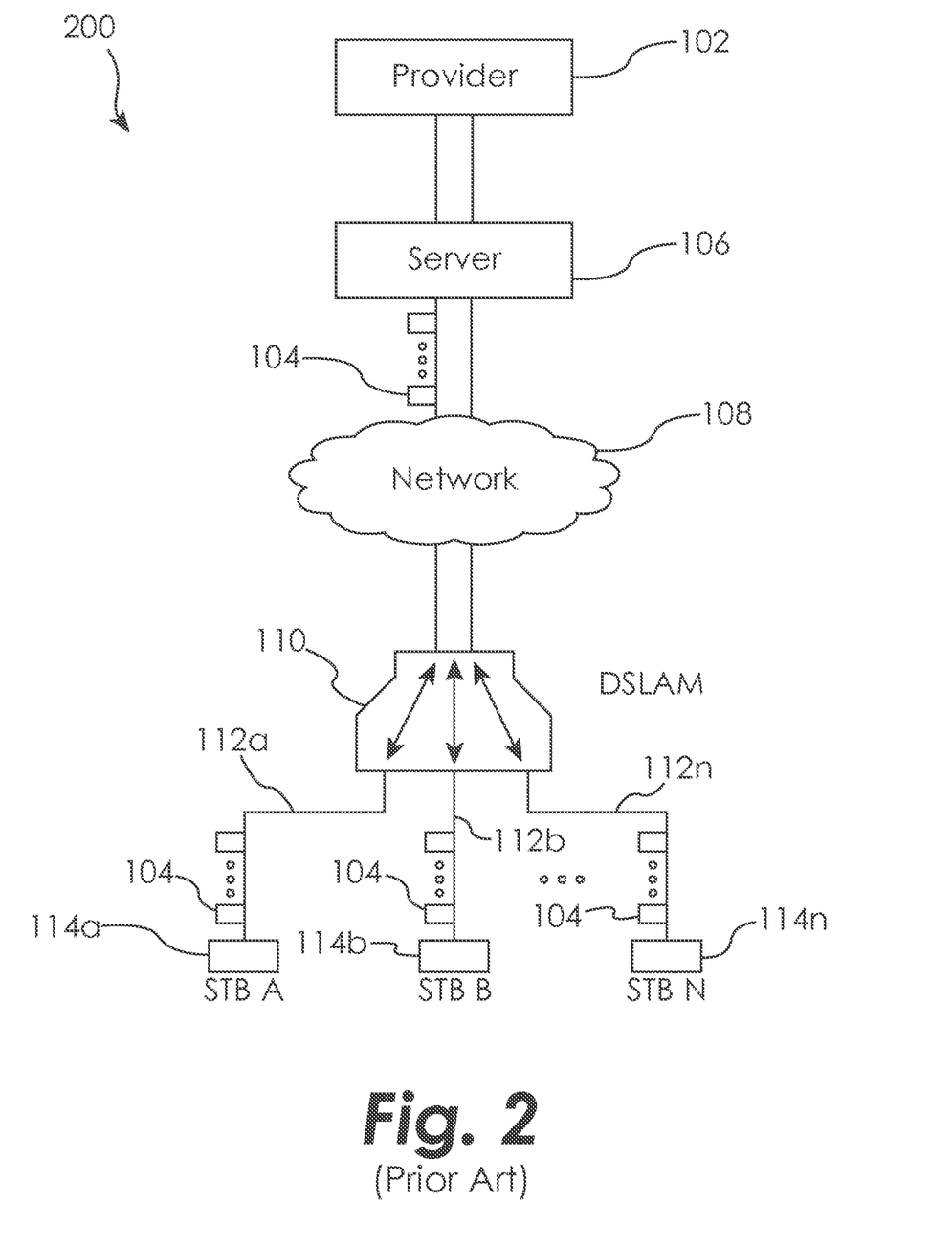
FIG. 2 is an illustration of a conventional system configured to deliver VOD via a multicast stream.

Therefore, service providers have begun to offer video content through a multicast video stream. A multicast video stream is illustrated in FIG. 2. Multicast stream network 200 is similar in most respects to unicast system 100. However, in contrast to the unicast video stream, multicast video streams are delivered to all subscribers connected to the network. As shown in FIG. 2, video 104 is delivered to all STBs 114a-n. In some versions of multicast VOD systems, multiple copies of the same video content are streamed through the network beginning at various intervals (e.g., every 15 minutes). This allows a video service provider to limit the number of video streams for particular video content, thereby limiting the amount of bandwidth dedicated to that video. However, multicast streaming requires the subscribers interested in the video content to begin watching the video content at a set time or at set intervals, which undermines the "on demand" aspect of VOD.

Figure 3:
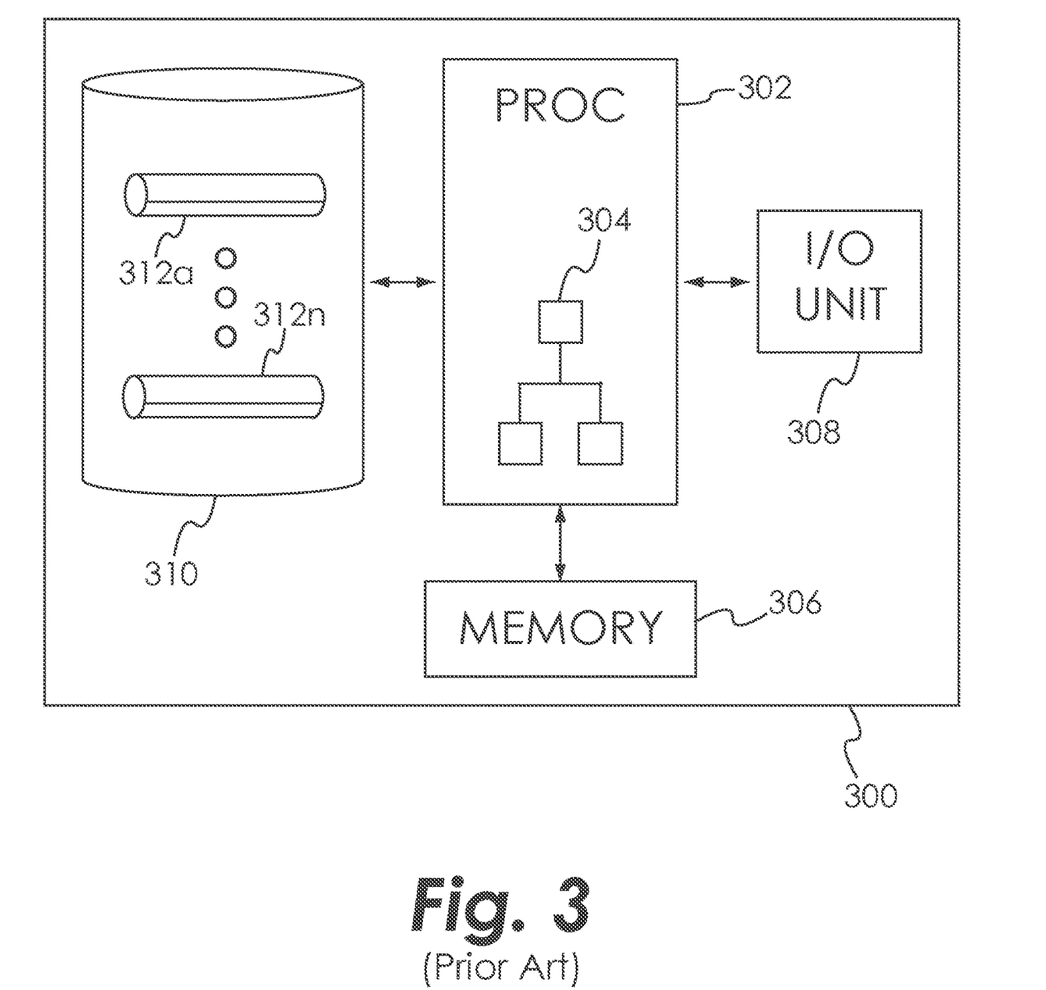
FIG. 3 is a block diagram of a conventional device utilized to receive content from a service provider.

Additionally, electronic devices exist on the market that allow users to receive and/or record video content based on the user's selection criteria. FIG. 3 is a block diagram of an exemplary electronic device 300. The device may be generally representative of a number of electronic devices utilized to receive and/or record video content. For example, the electronic device 300 may represent STB 114 or 214, or a digital video recorder (DVR). A STB is an electronic device that connects a television or display unit to an external signal source. In the context of VOD, the external source may be a unicast or multicast transmission. The STB decodes the signal content into a suitable form which is then displayed. Many of today's STBs are also DVRs. A DVR is a device that records video into a digital format to a disk drive or other memory medium within the device. Additionally, some DVRs enable a user to transfer recorded content to other electronic devices, such as a personal computer.

As shown, the device 300 includes a processing unit 302, which may be formed of one or more processors, that executes software 304. The software 304, depending upon the system functionality, may be configured to store and (i) manage information, such as video content and/or (ii) manage interaction with an end-user to download video programming and images for display on a television or other electronic display.

The processing unit 302 may be in communication with a memory 306. The processing unit 302 may also be in communication with an input/output (I/O) unit 308 that is configured to communicate with a television or other electronic display, remote control, network, or other devices, such as digital video disc (DVD), internal or external DVR, or any other local or network located device. The processing unit 302 may additionally be in communication with a storage unit 310 that is configured to store video data files in data repositories 312a-312n (collectively 312).

However, there is a need for an improved system and method for storing data delivered by a service provider on a STB.

SUMMARY

The present invention provides an improved system and method for storing data content from a service provider to an electronic device associated with a network subscriber. The claims, and only the claims, define the invention.

The principles of the present disclosure provide a system and method for pushing a variety of video, audio and/or data files onto the service provider reserved memory of an electronic device associated with a network subscriber. The disclosed system and method allows a service provider to push data to the "edge" of an IP network, where the data can then be accessed by the subscriber. The disclosed system and method reduces valuable core network peak bandwidth and processing resources by increasing the amount of information locally available to the subscriber. Additionally, the local pushed data is readily available to the subscriber for fast and reliable access.

A system and method for utilizing a secured service provider memory are disclosed. In one aspect of the present disclosure, an electronic device is associated with a subscriber and is in communication with a data distribution network configured to deliver data by a service provider to the subscriber. The data distribution network comprises a server in communication with the data distribution network and the server configured to deliver a stream of data over the data distribution network. The electronic device comprises a first memory communicatively connected to the server. The first memory is configured to receive and store data from the server and it is accessible by the subscriber. A second memory is also communicatively connected to the server. The second memory is configured to receive and store data from the server, though the second memory is accessible only by the service provider.

It is an object of certain embodiments of the present disclosure is to provide an improved system and method for storing data content from a service provider to an electronic device associated with a network subscriber.

Further, objectives and advantages of the present invention will appear as the description proceeds.

DETAILED DESCRIPTION OF THE PREFERRED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

The language used in the claims is to only have its plain and ordinary meaning, except as may be explicitly defined herein. Such plain and ordinary meaning is inclusive of all consistent dictionary definitions from the most recently published Webster's dictionaries and Random House dictionaries.

The principles of the present disclosure provide a system and method for pushing a variety of video, audio and/or data files onto the service provider reserved memory of an electronic device associated with a network subscriber. The disclosed system and method allows a service provider to push data to the "edge" of an IP network, where the data can then be accessed by the subscriber. The disclosed system and method reduces valuable core network peak bandwidth and processing resources by increasing the amount of information locally available to the subscriber. Additionally, the local pushed data is readily available to the subscriber for fast and reliable access.

Figure 4:
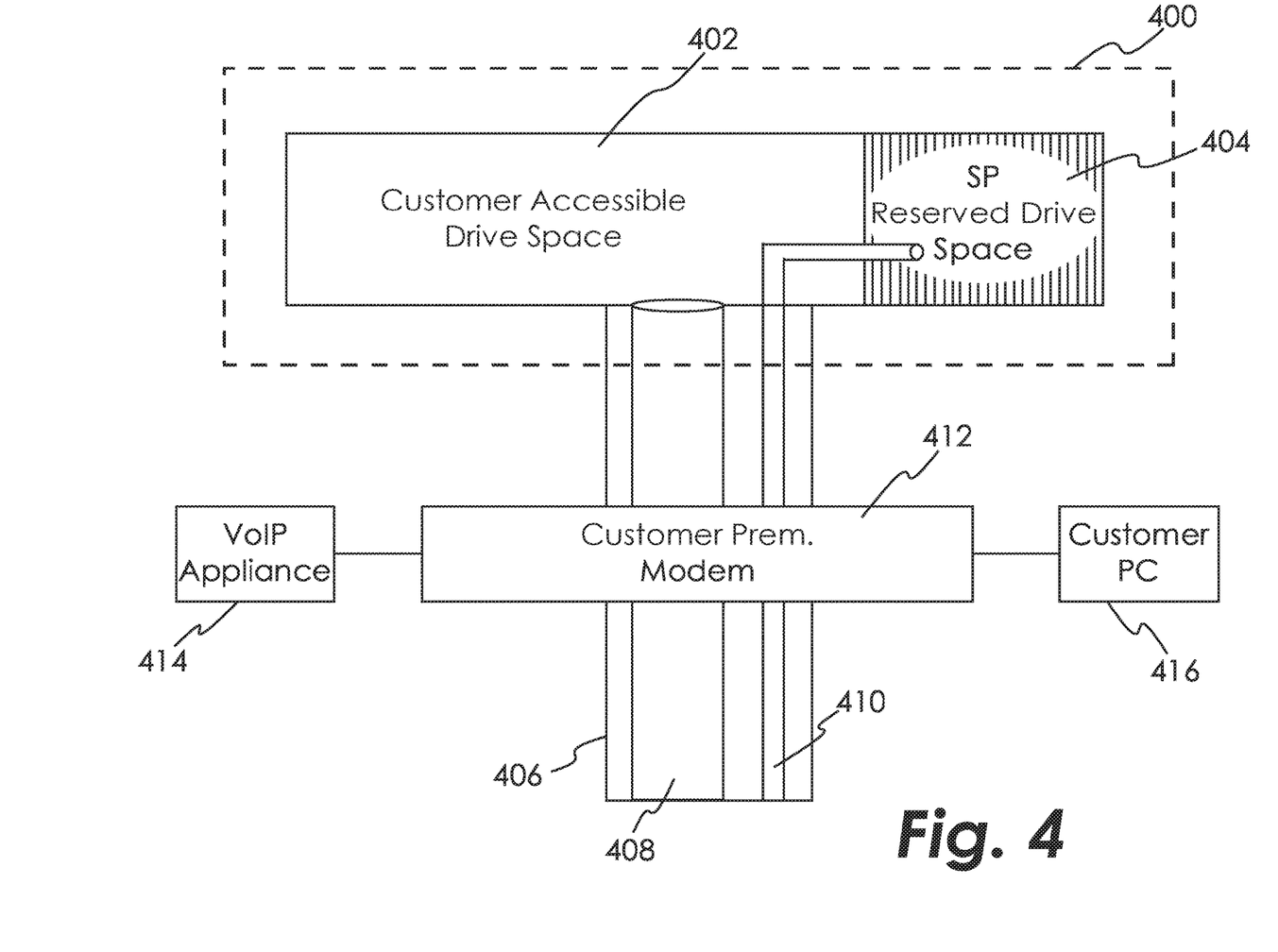
FIG. 4 is an illustration of an exemplary system configured to receive data content in accordance with the principles of the present disclosure.

FIG. 4 is a block diagram depicting an illustrative embodiment of the disclosed system and network locally available to the subscriber. Subscriber electronic device 400 is generally illustrated by the dashed line and comprises both subscriber accessible memory 402 and service provider reserved memory 404. As illustrated, subscriber accessible memory 402 and service provider reserved memory 404 may be portioned areas of a common memory. In another embodiment, subscriber accessible memory 402 is separate and distinct from service provider reserved memory 404. Alternatively, service provider reserved memory 404 is a section of memory addresses reserved for the service provider. In some embodiments, memories 402 and 404 are non-volatile memory components of electronic device 400, such as, but not limited to, a hard disk drive, RAM, or ROM. Non-volatile memories retain stored memory when power is lost. In one embodiment, memories 402 and 404 are configured to store media content files and other forms of information, such as software patches. Media content files may comprise one or more media files, such as, but not limited to, a video and/or audio file. In one embodiment, subscriber accessible memory 402 is communicatively connected with service provider reserved memory 404. In one embodiment, electronic device 400 is a STB.

In the illustrated embodiment, electronic device 400 is communicatively connected to the network via virtual circuit 406. Virtual circuit 406 comprises a subscriber virtual LAN (VLAN) 408 and service provider VLAN 410. Subscriber VLAN 408 is communicatively connected to subscriber accessible memory 402. Similarly, service provider VLAN 410 is communicatively connected to service provider reserved memory 404. VLANs 408 and 410 are configured to deliver video, audio and/or data content over the network to subscriber memory 402 and service provider memory 404, respectively. Further, VLANs 408 and 410 are configured to provide upstream and downstream data access between STB 400 and the service provider. The service provider may configure VLAN 410 such that the service provider has access to service provider memory 404 at all times.

In one embodiment, the service provider has complete control over the management of the service provider reserved memory 404. Accordingly, the service provider alone is able to push files, delete files and make any necessary changes to service provider memory 404. Because the subscriber has no control over service provider memory 404 and cannot add any information onto it, the service provider is guaranteed a certain amount of memory is available on STB 400 to the service provider. In some embodiments, the subscriber is not even aware of the existence of service provider memory 404.

A subscriber premise modem 412 is also communicatively connected to virtual circuit 406. Additionally, modem 412 is communicatively connected to subscriber voice-over-IP (VoIP) appliance 414 and personal computer 416. Modem 412 is configured to communicatively connect subscriber memory 402 and service provider memory 404 to VoIP device 414 and computer 416. In other embodiments, the modem may be replaced by a router, switch or any other device capable of relaying information from one electrical component to another.

Figure 5:
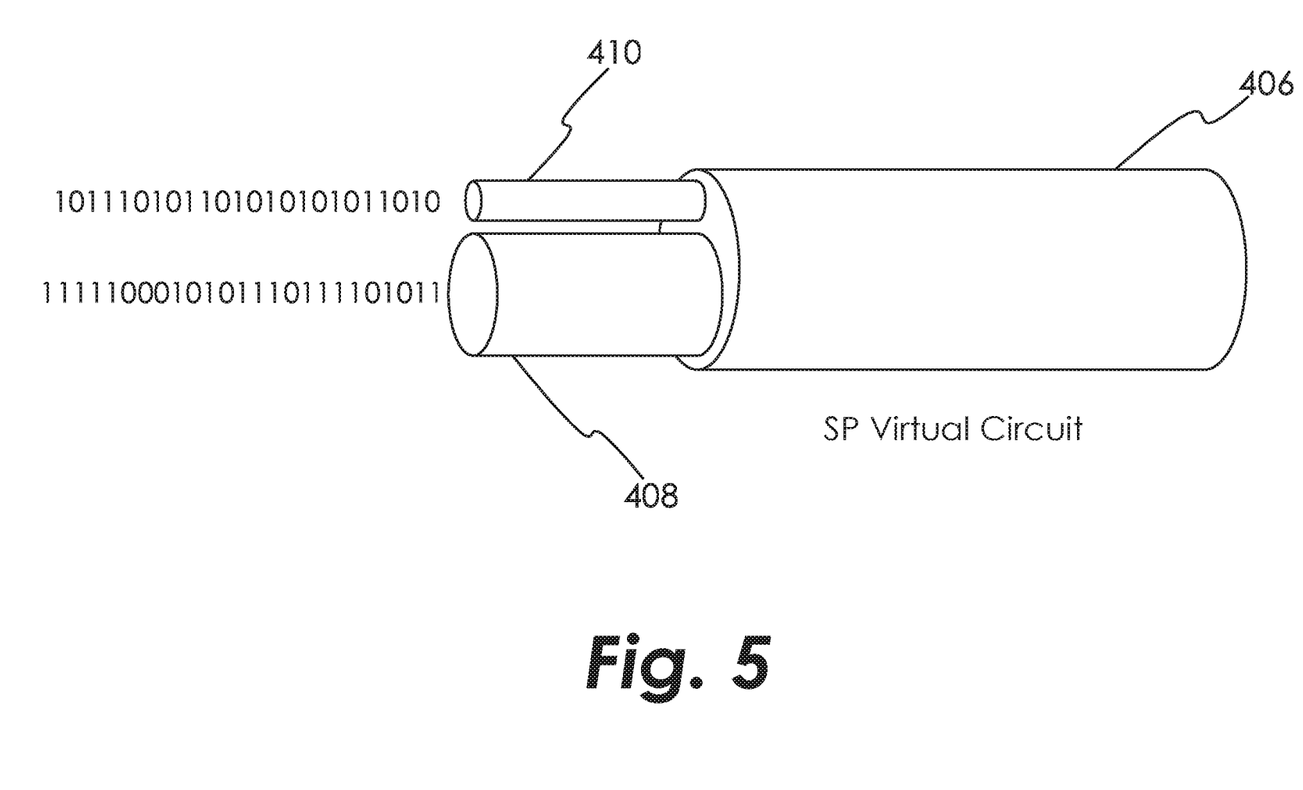
FIG. 5 is a further illustration of the exemplary virtual circuit illustrated in FIG. 4.

FIG. 5 is an exploded view of service provider virtual circuit 406. As explained above, virtual circuit 406 comprises subscriber VLAN 408 and service provider specific VLAN 410. As illustrated by the different streams of 1s and 0s, VLAN 408 may stream different information than VLAN 410. In one embodiment, data may be streamed over VLANs 408 and 410 at different rates. Traffic destined for service provider reserved memory 404 may be identified and/or limited by various methods. For example, traffic may be identified and/or limited by, but is not limited to, a virtual circuit, p-bits, traffic type, port type (both physical and/or logical) or any other distinguishable factor.

Figure 6:
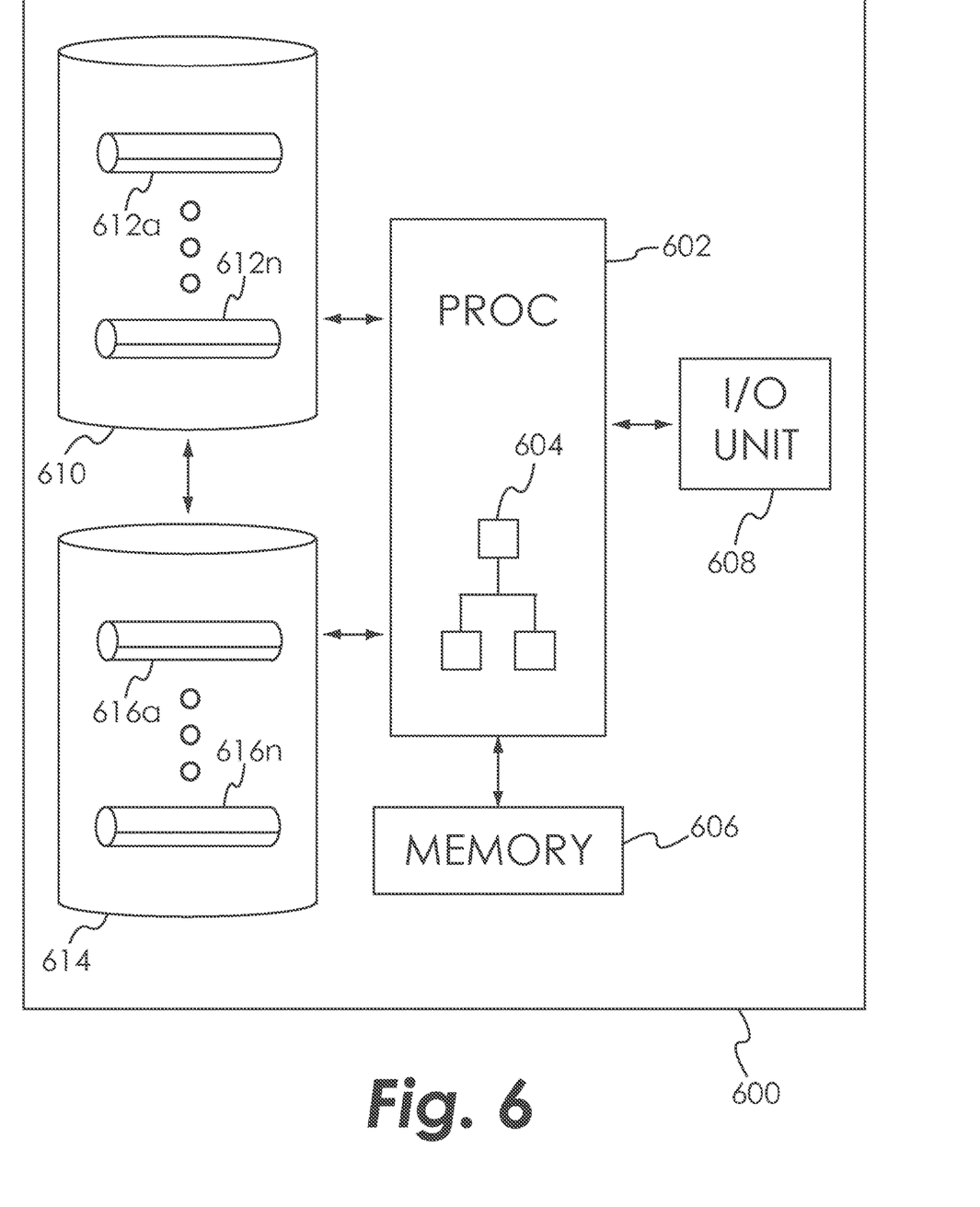
FIG. 6 is a block diagram of an electronic device utilized to receive and store content from a service provider.

FIG. 6 is a block diagram of an exemplary system device 600 utilized to receive and/or store data from a service provider. The data may include, but is not limited to, video content, music content, software data, software patches, picture content, etc. In one embodiment, system device 600 is a STB. In another embodiment, system device 600 is a DVR. As shown, the device 600 includes a processing unit 602, which may be formed of one or more processors, that executes software 604. The software, depending upon the system functionality, may be configured to store and (i) manage information, such as video content, (ii) manage routing of video streams, (iii) locate and store existing video streams and/or (iv) manage interaction with an end-user to download video programming and images for display on a television or other electronic display. Software 604 may also include a memory space management component.

The memory space management component verifies the amount of used and unused memory space. The memory space management component also reports memory space usage and performance back to the service provider. This functionality allows the service provider to dynamically push video and/or other data content to the subscriber. The memory space management software can constantly monitor file size, age and/or any other gating factors that would allow the software 604 to make decisions, such as how long a file is available or when a file should be purged. For example, a new release video may be made available by the service provide for a certain amount of time. Once this time has expired, the file would be deleted. The same principles can be applied to all file types on the service provider specific memory and can be configured remotely by the service provider by known techniques, including, but not limited to, GUI or CLI-type interfaces.

The processing unit 602 may be in communication with a memory 606. The memory 606 may be a random access memory, flash memory, or any other memory type. The processing unit 602 may also be in communication with an input/output (I/O) unit 608 that is configured to communicate with a television or other electronic display, remote control, network, or other devices, such as a DVD, DVR, or any other local or network located device. The processing unit 602 may additionally be in communication with a storage unit 610 that is configured to store data files in data repositories 612a-612n (collectively 612).

The processing unit 602 may further be in communication with a storage unit 614 that is configured to store data files in data repositories 616a-616n (collectively 616). Storage unit 610 is in communicative connection with storage unit 614 such that data may be transferred between the storage units. In one embodiment, data repositories 616 represent the memory only accessible by the service provider. Therefore, the service provider is ensured a specified amount of storage space to work with remotely. As described herein, the service provider specific data repositories 616 and/or memory may be used by a service provider to push video content and/or other forms of data to system device 600. In one embodiment, the service provider may push software patches to the system device 600. This functionality allows a service provider to ensure that each subscriber device has the most up-to-date software and complete functionality, all without the subscribers needing to perform any updates themselves.

Figure 7:
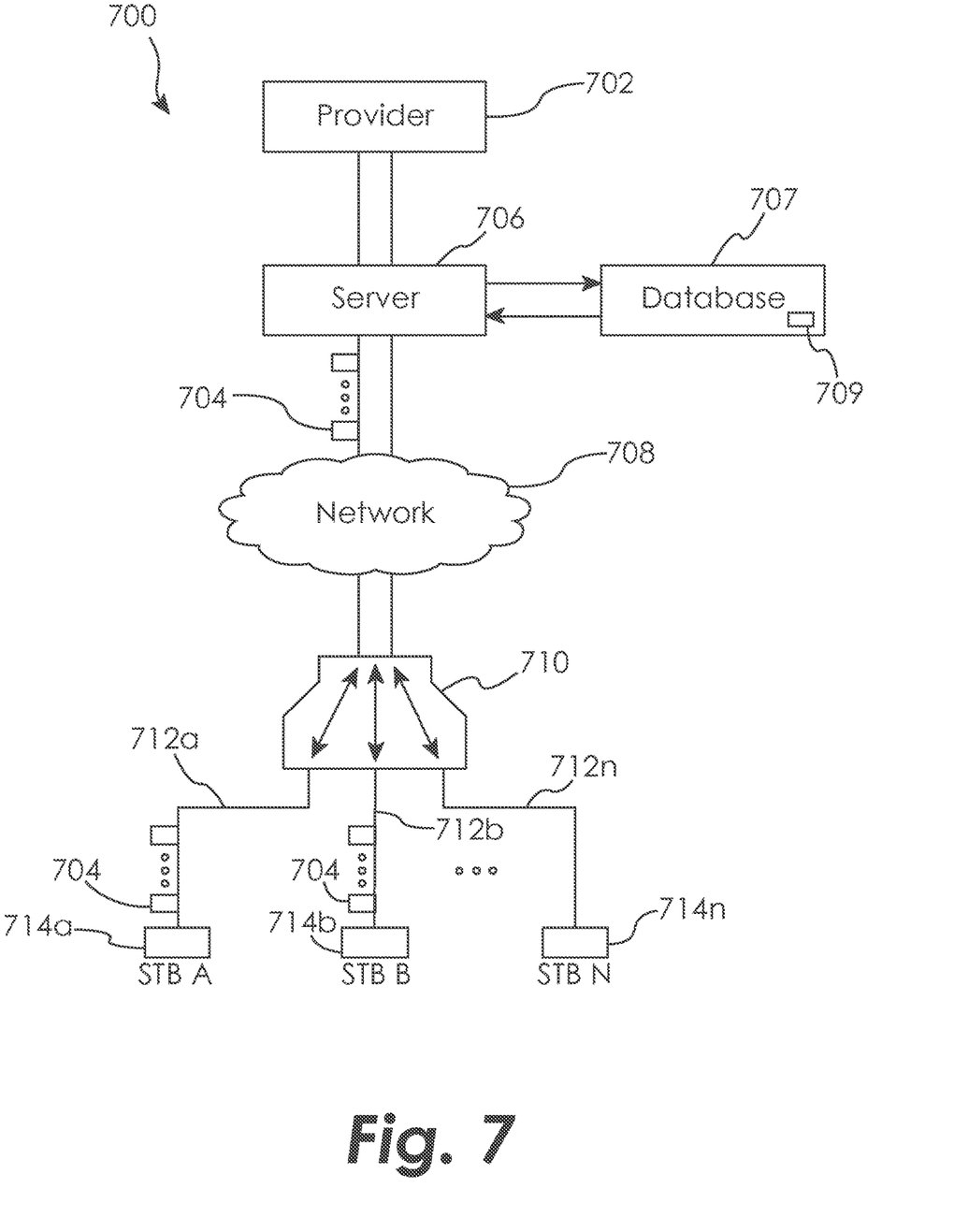
FIG. 7 is an illustration of an exemplary system configured to deliver content in accordance with the principles of the present disclosure.

FIG. 7 is an illustration of an exemplary network 700 configured to deliver VOD content to network subscribers in accordance with the principles of the present disclosure. As shown, a provider 702 is communicatively connected to a head-end server 706, which is communicatively connected to a database 707. A processor 709 is communicatively connected with database 707. Server 706 is used to store video content delivered, transferred and/or uploaded to it from provider 702. The server 706 is also capable of delivering video content 704 over a network 708, such as the internet or public/private PSN, for example. As shown, server 706 is configured to transmit video content in the form of data packets 704. The server 706 delivers the video content 704 via the network 708 to a DSLAM 710. The DSLAM 710 operates to connect subscribers to the network 708, host video streams/Internet IGMP, and provide Ethernet transport of the video content. The DSLAM 710 further operates as a multiplexer to distribute the video 704 through communication lines 712a-712n to STBs 714a-714n (collectively 714). Additionally, the DSLAM 710 may also communicate VOD requests from a particular STB 714 to the server 706 via network 708.

As previously noted, network 700 includes database 707 and processor 709. Database 707 may be configured to maintain subscriber activity data of the STBs 714 connected to network 708. More particularly, database 707 may maintain data related to the VOD viewing habits of the subscriber's associated with network 708. In one embodiment, the subscriber activity data may be directly gathered from VOD requests being transmitted to server 706. In another embodiment, the data may be collected through another means and then transferred or uploaded onto the database 707.

Database 707 may be configured to receive information related to particular video content from server 706. Some aspects of the present disclosure will be explained through the use of an example. For instance, subscriber B. Wayne may wish to watch a particular video, such as "The Dark Knight," through his provider's VOD service. B. Wayne will use STB A 714*a* to initiate his request, which will travel through communication line 712*a* to DSLAM 710. DSLAM 710 then transmits the request to server 706 through network 708. In one embodiment, the server 706 transmits video information related to "The Dark Knight," such as title, genre, rating, release date, cast, director, producer, etc. The database 707 may be configured to receive the video information from server 706. Associated processor 709 may then process the subscriber activity data with respect to the video information (e.g. determine and record that subscriber B. Wayne has an affinity for video content related to the video information). Processor 709 may be configured to identify additional subscribers within the network 708 determined to likely make a VOD request for the particular video content. Processor 709 may be provided within database 707 (as shown) or maintained separately from database 707. Once the subscriber activity data has been processed, processor 709 may deliver the results back to database 707 or server 706. In one embodiment, processor 709 may generate a list of subscribers likely interested in the video content.

Returning to the example, database 707 will receive information related to "The Dark Knight," such as genre: action, rating: PG-13, and release date: Dec. 8, 2008. The database 707 may provide this information to processor 709 which may then process this information through known algorithms, processes and/or metrics to determine other viewers that will likely request "The Dark Knight" through VOD. Subscriber H. Dent, for example, may consistently request VOD related to new release, action movies. Another subscriber, A. Pennyworth, may often request comedy films released in the 1980*s*. In this instance, processor 709 may identify H. Dent as potentially interested in "The Dark Knight." Accordingly, database 707 or processor 709 may transmit a list identifying H. Dent as potentially interested in "The Dark Knight" to server 706.

As noted above, server 706 is configured to stream video content to STBs 714 associated with network 708. Upon receipt of the list of additional subscribers, server 706 may be configured to both deliver the video content to (1) the initial requester of the video and (2) the additional subscribers indicated by database 707 as being likely interested. In one embodiment, server 706 may "push" the particular video content to the service provider specific memory of the STBs associated with potentially interested subscribers. As used herein, the term "push" means that the data will be stored either on the service provider reserved memory space of the STB or on any other memory device dedicated to the service provider. In one embodiment, the subscriber does not have access to the pushed data or video content.

In the above example, B. Wayne will receive and watch "The Dark Knight" just like any other VOD request. However, server 706 will also send "The Dark Knight" to H. Dent, and more particularly to the service provider specific memory of STB B 714*b*, via multicast stream. In one embodiment, server 706 instructs video 704 to be stored on the service provider specific memory of STB B 714*b*. In one version, H. Dent may then be notified that "The Dark Knight" is ready for immediate viewing. Provider 702 may also allow this "pushed" video content to be viewed by the additional subscribers at a reduced rate. Later, if H. Dent elects to view "The Dark Knight," it will play directly off of the service provider specific memory of STB B 714*b*, instead of being streamed from server 706. Therefore, an additional subscriber gets to view the video content with no additional traffic on the network.

Due to STB memory constraints, the server 706 may check for available memory capacity on the service provider specific memory of a particular STB. In one form, old video content may be deleted if there is not sufficient memory available for new, pushed video content. It is further contemplated that the service provider specific memory of the STB is dedicated for pushed video content.

Figure 8:
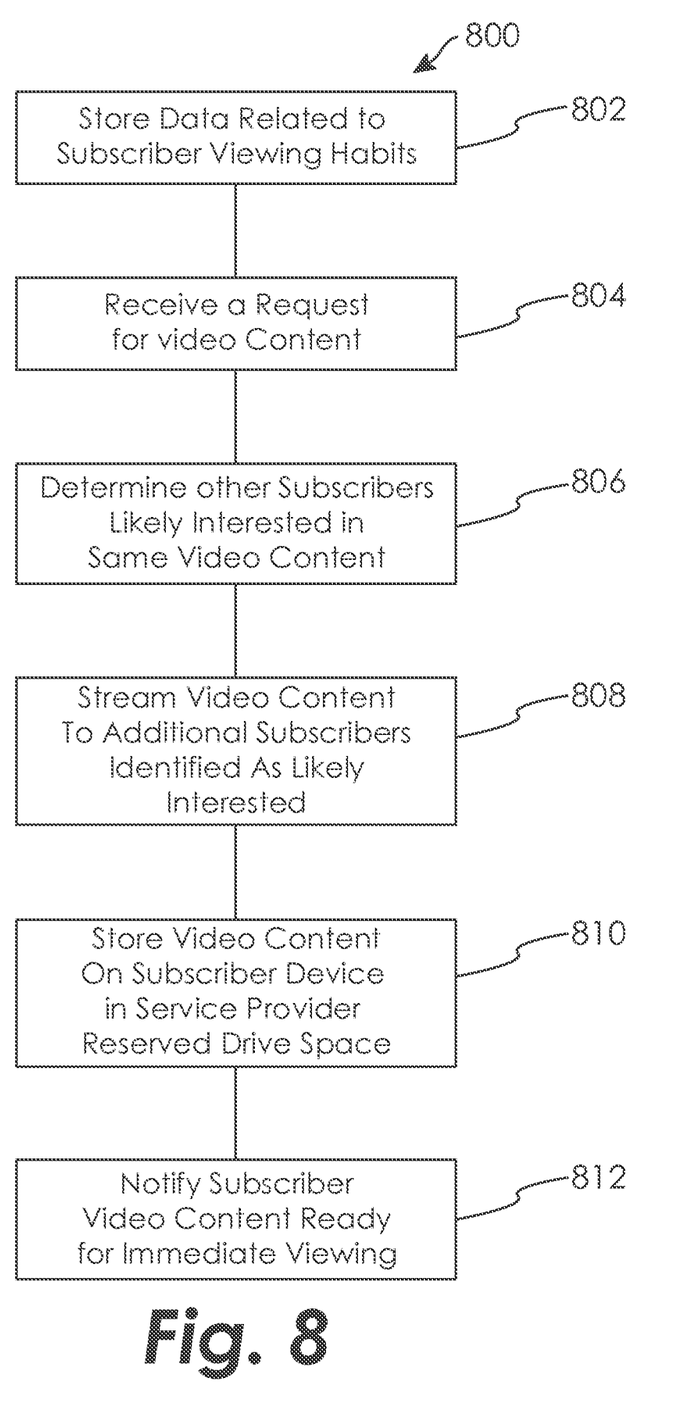
FIG. 8 is a flow chart for network operation for delivering video content to a subscriber.

FIG. 8 is a flow chart of an exemplary process 800 for system operation for delivering VOD to subscribers, and more specifically to push data and/or video content to the service provider specific memory of a subscriber STB. The process 800 starts at step 802, where data is stored related to the viewing habits of subscribers within the network. At step 804, a request for video content is received at a first network device. The first network device may be a server. At step 806, a second network device determines other subscribers within the network that are likely interested in the same video content. The second network device may be a database with an associated processor. The second network device determines the other interested subscribers through processes, algorithms, and/or metrics known in the art. At step 808, the video content is streamed to the additional subscribers. The video is also delivered to the subscriber who originally made the request for the video content. The video content may be streamed through a multicast video stream. At step 810, the video content is stored on the service provider reserved memory of an electric device of the end user. In one embodiment, the electronic device may be a STB. In another embodiment, the electronic device may be a DVR.

At step 812, the STB may notify the subscriber that the VOD content is available for immediate viewing. Optionally, the network may allow the subscriber to view the "pushed" VOD content at a reduced rate.

Figure 9:
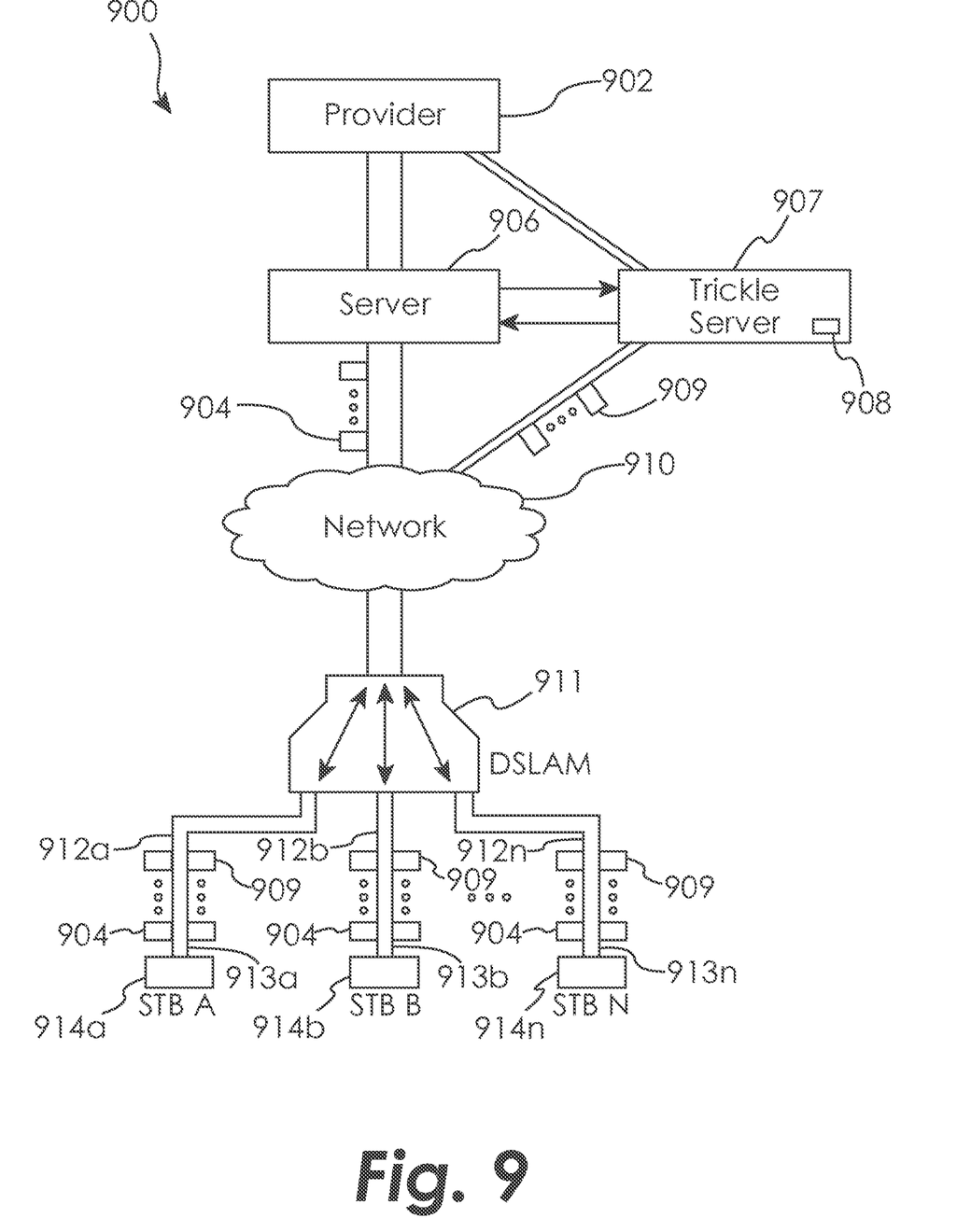
FIG. 9 is an illustration of an exemplary system to deliver data content in accordance with the principles of the present disclosure.

FIG. 9 is an illustration of an exemplary network 900 configured to deliver VOD content to network subscribers in accordance with the principles of the present disclosure. As shown, a service provider 902 is communicatively connected to a head-end server 906, which is communicatively connected to a trickle server 907. A processor 908 is communicatively connected with trickle server 907. Server 906 and trickle server 907 are used to store video content delivered, transferred and/or uploaded to it from provider 902. Server 906 is capable of delivering video content 904 over a network 910, such as the internet or public/private PSN, for example. As shown, server 906 is configured to transmit video content in the form of data packets 904. The server 906 delivers the video content 904 via the network 910 to a DSLAM 911. The DSLAM 911 operates to connect subscribers to the network 910, host video streams/IGMP, and provide Ethernet transport of the video content. The DSLAM 911 further operates as a multiplexer to distribute the video 904 through communication lines 912*a*-912*n* to STBs 914*a*-914*n* (collectively 914). Additionally, the DSLAM 911 may also communicate VOD requests from a particular STB 914 to the server 906 via network 910.

As previously noted, network 900 includes trickle server 907 and processor 908. Trickle server 907 is capable of delivering video content 909 over the network 910. As shown, trickle server 907 is configured to transmit video content in the form of data packets 909. For the sake of clarity, video content 904 is distinguished from video content 909, though the video content of each may relate to the same video or data. However, as used herein, video content 904 represents the video content delivered from server 906 to STBs 914 via multicast streams. Video content 909 represents the video content trickled or pushed to service provider memory of STBs 914 as described herein. Though the data streamed from the servers in the illustrated embodiment represents video content, the data may represent any information or data the service provider wishes to be pushed or stored on STBs 914.

Like server 906, trickle server 907 delivers the video content 909 via the network 910 to DSLAM 911. The DSLAM 911 further operates as a multiplexer to distribute the video 909 through communication lines 913a-913n to STBs 914. As shown, communication lines 912 and 913 are shown as distinct lines from DSLAM 911 to STBs 914. In another embodiment, communication lines 912 and 913 may comprise a single data communication line. Processor 908 may be provided within trickle server 907 (as shown) or maintained separately from trickle server 907. As illustrated, trickle server 907 exists as a separate unit from server 906. Alternatively, trickle server 907 and server 906 may form or exist in a single unit.

In accordance with one embodiment of the present disclosure, server 906 distributes video content 904 via a multicast stream. For example, server 906 may stagger streams of "Movie A" in 15 minute intervals. In the known systems, such as multicast network 200, a subscriber wishing to view "Movie A" would either have to wait until the next stagger started or begin watching the most recent stream and miss some of the previously streamed content.

In order to provide the subscriber with a true VOD experience, a segment of video content 909 is slowly streamed to STBs 914 where the segment can be stored in memory reserved for the service provider. In one embodiment, the service provider reserved memory is completely inaccessible to the subscriber. As described above, video content 909 represents the video content, trickled or pushed to STBs 914. Server 906 may communicate with trickle server 907 and/or processor 908 to provide information related to the video content. For example, server 906 may communicate the stagger interval of "Movie A" to trickle server 907 and/or processor 908. Processor 908 may then the determine the appropriate parameters of trickle delivery, such as the time required to push the appropriate segment of "Movie A", the amount of service provider reserved memory on STB 914 required to store the segment of "Movie A", etc.

In one embodiment of the present invention, the service provider 902 may determine to trickle or push a segment of video content 909 only for high-demand or seasonal content. If more subscribers are simultaneously watching the video content than the number of multicast streams, then bandwidth is saved on the network.

In one embodiment of the present invention, the service provider 902 determines a particular trickle rate or bandwidth to push a segment of video content onto the service provider reserved memory of STBs 914. The service provider 902 may determine a trickle rate applicable to all video content. Alternatively, the trickle rate may be dependent on the particular video content. The trickle rate may be determined by balancing competing interests. First, the service provider 902 may want the trickle bandwidth to be large enough to push the segment of video onto STB 914 in a reasonable amount of time. Second, the service provider 902 may not want the trickle bandwidth to be so large so as to impede the subscriber's viewing ability. In one embodiment, the trickle bandwidth is determined to be 512 Kbps. In the illustrated embodiment, bandwidth is "carved" out between the service provider 902 and STB 914 such that the service provider 902 maintains access to push and/or pull files from a desired STB at all times.

In one embodiment, the service provider, server 906, trickle server 907 and/or processor 908 may periodically determine whether stored segment 909 has been accessed. If the stored segment 909 has gone unused for a specific number of days or weeks, the service provider may determine that the stored segment 909 should be deleted from the service provider reserved memory.

Although the principles of the present disclosure have been described in association with set top boxes, it should be understood that the set top box functionality may be incorporated into a television or network and use the principles of the present disclosure in the same or similar manner.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

What is claimed is:

1. A system for delivering video content by a service provider to a plurality of subscribers, comprising:
 a respective electronic device associated with each of the plurality of subscribers, each respective electronic device having a first memory and a second memory, the respective electronic device configured to deny the plurality of subscribers access to the second memory;
 a network server and a database, the database storing data associated with the viewing habits of the subscribers;
 a processor configured to receive a request from a first subscriber for the video content at the network server;
 a processor configured based on the request received from the first subscriber, to query the database to determine subscribers other than the first subscriber likely interested in the video content, the query resulting in the identification of a subset of the plurality of subscribers other than the first subscriber likely interested in the video content;
 a processor configured to deliver the video content to both a first electronic device associated with the first subscriber to stream and second electronic devices associated with the subset of the plurality of subscribers for storage;
 a processor configured to store the video content on the second memory of the second electronic devices associated with the subset of the plurality of subscribers, the second memory being accessible by a service provider via a virtual local area network ("VLAN") to configure, push files, delete files, or make changes to the second memory; and
 a processor configured to be responsive to a request to view the video content from a respective one of the second electronic devices, granting, via the respective one of the second electronic device, access to the video content for immediate viewing of the video content on the second memory of the respective one of the second electronic devices.

2. The system of claim 1, wherein the network server is configured to check the available bandwidth capacity of network lines associated with the at least one electronic device associated with the list of likely interested subscribers.

3. The system of claim 1, wherein the list of likely interested subscribers is determined based on information related to the particular video content, the information including at least one of a title, genre, rating, release date, cast, director and producer.

4. The system of claim 1, wherein the electronic device is a set top box.

5. The system of claim 1, wherein the processor is further programmed to:
- determine whether to push the particular video content to each subscriber in the list of subscribers, based on the viewing habits of each subscriber in the list of subscribers;
- determine parameters for pushing the particular video content to the second memory of the electronic device, wherein the parameters include an amount of memory on the second memory required to store the particular video content; and
- push the particular video content to the second memories of the electronic devices associated with the list of subscribers in response to determining that the particular video content should be pushed and that the parameters can be satisfied.

\* \* \* \* \*